United States Patent Office 3,418,801
Patented Dec. 31, 1968

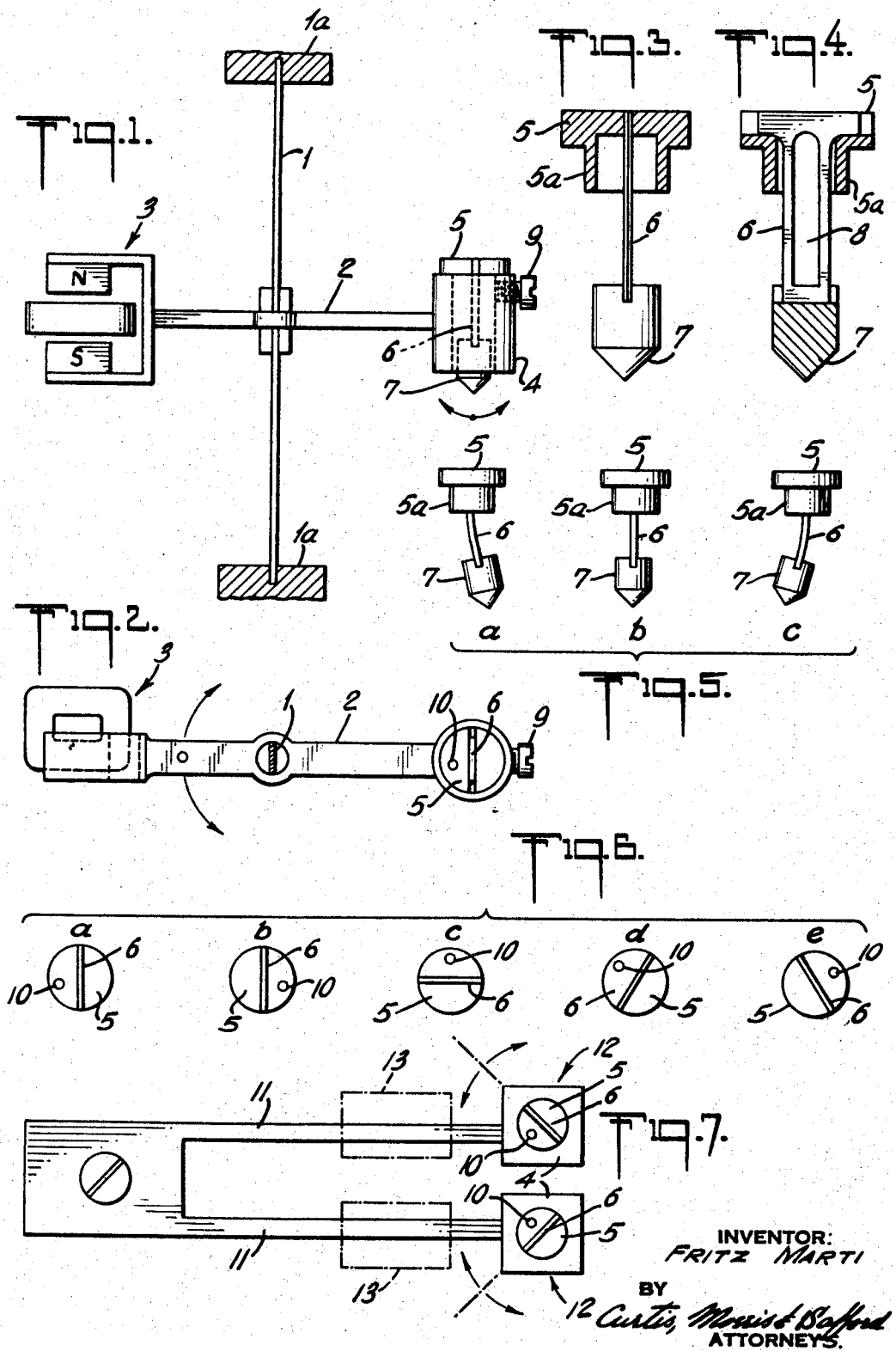

3,418,801
DEVICE FOR COMPENSATING FOR THERMAL CHANGES IN OSCILLATORS
Fritz Marti, La Chaux-de-Fonds, Switzerland, assignor to Portescap le Porte-Echappement Universel S.A., La Chaux-de-Fonds, Switzerland
Filed Nov. 29, 1966, Ser. No. 597,787
Claims priority, application Switzerland, Dec. 22, 1965, 17,898/65
10 Claims. (Cl. 58—108)

This invention relates to means compensating for changes in the oscillation characteristics of a mechanical oscillation device due to temperature changes; more particularly, this invention relates to temperature compensation mechanisms for maintaining constant the oscillation frequency of an electromechanically-energized oscillator used in timepieces.

In a specific embodiment of the invention described herein, the oscillator is composed of a thin, flat metal torsion member with an oscillator arm secured thereto. An electromagnetic drive arrangement swings the arm back and forth about the torsion member, and this movement is used to drive the hands of a timepiece.

The accuracy of a timepiece depends upon the accuracy with which the frequency of its oscillator can be maintained constant. Ambient temperature changes can change the oscillation frequency of a mechanical oscillator due to a number of different effects. One effect, it is believed, is that the elasticity of the torsion member changes with temperature. Also, the oscillator components expand and contract with temperature, and change their dimensions.

It is a major object of the present invention to provide an oscillator mechanism with automatic compensation for temperature changes whereby its oscillation frequency is maintained constant with a high degree of accuracy. It is an object to correct not only for changes in elasticity (termed herein as correcting the "thermo-elastic coefficient" of the oscillator), but also for all other errors in the frequency of oscillation caused by temperature changes. It is a further object to provide such a mechanism which is trouble-free in operation and relatively simple to adjust.

The accompanying drawings and description describe the invention and its operation. In the drawings:

FIGURE 1 is an elevation view of an oscillator device constructed in accordance with the present invention;

FIGURE 2 is a plan view of the oscillator shown in FIGURE 1;

FIGURES 3 and 4 are two enlarged, partially cross-sectional views at right angles to each other showing a portion of the device of FIGURE 1;

FIGURE 5 is an elevation view of the structure of FIGURES 3 and 4 in three different positions;

FIGURE 6 is a plan view of the structure of FIGURES 3 and 4 in five different positions of adjustment; and FIGURE 7 is a plan view of another embodiment of the invention.

The oscillator shown in FIGURES 1 and 2 comprises a thin metallic torsion blade 1 secured at its ends to a support structure 12 of a timepiece. Secured to the blade 1 at its center is a cross-arm 2. At one of the ends of the cross-arm 2 is an electromagnetic device 3 for rocking the arm 2 back and forth about the blade 1 and thus sustaining its oscillation. A transistorized electrical oscillator circuit provides the device 3 with periodic impulses. The oscillator circuit is not shown in the drawings. However, it is well-known and its operation is more fully described in my co-pending U.S. patent application, Ser. No. 585,129, filed on Oct. 7, 1966 and entitled "Oscillator Device For Timepiece Mechanisms." Further details of the oscillation sustaining device 3 are shown in my co-pending U.S. patent application, Ser. No. 585,095 filed on Oct. 7, 1966 and entitled "Vibrator Device."

On the other end of the cross-arm 2 there is fastened a tubular support 4, made, for example, of brass, into which is fitted the cylindrical end 5a of a plug 5. Plug 5 is adjustably secured with respect to the sleeve 4 by means of a set-screw 9. The upper end of a bi-metallic blade 6 is secured to the plug 5. At the lower end of the blade 6 is secured a weight 7 which is partially enclosed in the bottom portion of the tubular member 4. The weight 7 is mounted so as to be adjustable longitudinally on the lower end of the bi-metallic strip 6. The bi-metallic strip 6 has a longitudinal opening 8 (see FIGURE 4) which assures freedom of the bi-metallic strip from deformation in a transverse direction.

The plug 5 can be rotated in the support sleeve 4 about its longitudinal axis which is parallel to the longitudinal axis of the torsion blade 1. The set-screw 9 makes its possible to lock the bi-metallic strip 6 and the plug 5 in any pre-selected angular position with respect to the cross-arm 2. A reference mark 10 (see FIGURE 6) is marked on the visible portion of the plug 5 so as to enable checking its angular position.

As is well-known, a bi-metallic strip is a strip formed of two dissimilar metals welded together. The metals have different temperature coefficients of expansion. Thus, the strip 6 bends or curls when its temperature changes.

FIGURE 5 shows the possible deformation of the bi-metallic strip 6 between two typical extreme limits of temperature; for example, between 5° C. as indicated in FIGURE 5a, and 35° C. as indicated in FIGURE 5c. At the normal average temperature of 20° C., the bi-metallic strip 6 is practically straight, as is shown in FIGURE 5b.

FIGURE 6 shows how to rotate the plug 5 in order to correct for various oscillation errors caused by temperature changes in a given oscillator. With the strip 6 adjusted to the position shown in FIGURE 6a, maximum positive compensation is obtained. The FIGURE 6b position gives maximum negative compensation, the FIGURE 6c position gives zero compensation, the FIGURE 6d position gives an intermediate compensation, and the FIGURE 6e position gives an intermediate negative compensation. By this means it is possible to adjust for temperature-change errors in each timepiece by adjusting the corrective bi-metallic strip 6 as described above and thus reduce the error due to variations in temperature to a very low level.

FIGURE 7 shows, as another embodiment of the invention, an electromechanical oscillator in the form of a tuning fork. Each of the two arms 11 of the oscillator is provided with an adjustable corrective bi-metallic strip device 12 like that shown in FIGURES 1 through 6, and with well-known electromechanical oscillation-sustaining device 13.

The above-described bi-metallic-strip corrective devices can be used in combination with one another. For example, two of the devices can be mounted at opposite ends of a cross-arm of a torsion blade oscillator with the devices oriented so as to deform in opposite directions. This arrangement makes it possible to balance the deformations of the corrective bi-metallic strips themselves. Each of the two branches of the cross-arm can be provided with a separate electromechanical oscillation-sustaining device.

The longitudinal axis of the corrective bi-metallic strip or strips need not be precisely parallel to the axis of oscillation of the vibrating member. All that is needed is that the movement of the weight attached to the bi-metallic strip adjust the moment of inertia of the oscillating member so as to maintain the oscillation frequency nearly constant despite temperature changes. It also should be understood that the oscillating cross-arm which bears the corrective bi-metallic strip or strips need not be perpendicular to the torsion blade. Other modifications can be made without departing from the present invention. For example, the above-described corrective device can be used with various other torsion oscillator structures such as those shown in my above-identified co-pending U.S. patent applications.

I claim:

1. Apparatus for correcting the effects of temperature changes in a timepiece oscillator device, said apparatus comprising at least one vibratory member mounted to oscillate about a pivot point, at least one-bi-metallic strip means, and means for mounting said bi-metallic strip means on said vibratory member in a manner such that said strip means can be rotated about its longitudinal axis to a desired position and secured in said position, the plane containing said longitudinal axis extending in substantially the same direction as the plane containing the axis of oscillation of said vibratory member.

2. A device according to claim 1 including means for locking said bi-metallic strip means in said desired position.

3. A device as in claim 1 in which said bi-metallic strip means includes a weight secured to one end of a bi-metallic strip.

4. A device according to the claim 1 including means for visually marking the angular position of said bi-metallic strip means with respect to said vibratory member.

5. A device according to claim 1 in which said bi-metallic strip means includes a plug to which a bi-metallic strip is secured, a tubular support member secured to one end of said vibratory member, said plug being rotatably fitted into said tubular support member.

6. A device according to claim 5 in which one end of said bi-metallic strip is fastened to the plug, and including a weight secured to the other end of said strip.

7. A device according to claim 6, in which the weight is movable longitudinally on said bi-metallic strip.

8. A device according to claim 1 in which said vibratory member is an arm fastened near its center to a torsion flexure blade, said bi-metallic strip means is fastened to one end of said arm, and including oscillatory drive means at the other end of said arm.

9. A device according to claim 1 in which said bi-metallic strip has a longitudinal slot.

10. A device according to claim 1 including two of said vibratory members, each comprising one tine of a tuning fork, and two of said bi-metallic strips, each secured at one end of one of said tines.

References Cited

UNITED STATES PATENTS

| | | | |
|---|---|---|---|
| 120,385 | 10/1871 | James | 58—133 |
| 1,653,794 | 12/1927 | Whitehorn | 84—457 X |
| 2,292,244 | 8/1942 | Smith | 58—108 |
| 2,433,160 | 12/1947 | Rusler | 84—409 |
| 2,732,748 | 1/1956 | Grib | 58—133 X |
| 3,014,168 | 12/1961 | Thoma | 58—133 X |

RICHARD B. WILKINSON, *Primary Examiner.*

S. A. WAL, *Assistant Examiner.*

U.S. Cl. X.R.

58—23